US008908863B2

(12) United States Patent
Chen et al.

(10) Patent No.: US 8,908,863 B2
(45) Date of Patent: Dec. 9, 2014

(54) METHOD, NETWORK ELEMENT, AND MOBILE STATION FOR NEGOTIATING ENCRYPTION ALGORITHMS

(75) Inventors: Jing Chen, Shanghai (CN); Yongfeng Deng, Shanghai (CN); Aiqing Zhang, Shenzhen (CN); Jun Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 13/415,681

(22) Filed: Mar. 8, 2012

(65) Prior Publication Data

US 2012/0170746 A1    Jul. 5, 2012

Related U.S. Application Data

(63) Continuation of application No. PCT/CN2010/076715, filed on Sep. 8, 2010.

(51) Int. Cl.
*H04L 9/00* (2006.01)
*H04L 29/06* (2006.01)
*H04W 12/02* (2009.01)

(52) U.S. Cl.
CPC .......... *H04L 63/0428* (2013.01); *H04L 63/205* (2013.01); *H04W 12/02* (2013.01)
USPC ........................................ 380/270

(58) Field of Classification Search
USPC .......................................... 380/270, 273, 277
See application file for complete search history.

(56) References Cited

U.S. PATENT DOCUMENTS

| 6,535,979 | B1 | 3/2003 | Vialen et al. |
| 2005/0078828 | A1 | 4/2005 | Zheng |
| 2005/0111666 | A1 | 5/2005 | Blom et al. |
| 2007/0157022 | A1* | 7/2007 | Blom et al. .................. 713/166 |
| 2008/0059789 | A1 | 3/2008 | Lucidarme et al. |

FOREIGN PATENT DOCUMENTS

| CN | 1289512 A | 3/2001 |
| CN | 1471326 A | 1/2004 |
| CN | 1479480 A | 3/2004 |

(Continued)

OTHER PUBLICATIONS

European Search Report received in European Application No. 10175725.0-1525, mailed Dec. 22, 2010, 8 pages.

(Continued)

*Primary Examiner* — Ellen Tran
(74) *Attorney, Agent, or Firm* — Slater & Matsil, L.L.P.

(57) ABSTRACT

A method, network element, and mobile station (MS) are disclosed. The method includes: obtaining information that a plug-in card of the MS does not support a first encryption algorithm; deleting the first encryption algorithm from an encryption algorithm list permitted by a core network element according to the information that the plug-in card of the MS does not support the first encryption algorithm; sending the encryption algorithm list excluding the first encryption algorithm to an access network element, so that the access network element selects an encryption algorithm according to the encryption algorithm list excluding the first encryption algorithm and the MS capability information sent from the MS and sends the selected encryption algorithm to the MS. By using the method, network element, and MS, errors due to the fact that the plug-in card of the MS does not support an encryption algorithm may be avoided during the encryption process.

6 Claims, 7 Drawing Sheets

(56) References Cited

FOREIGN PATENT DOCUMENTS

| CN | 1571540 A | 1/2005 |
|---|---|---|
| CN | 1708005 A | 12/2005 |
| CN | 1857024 A | 11/2006 |
| CN | 1937487 | 3/2007 |
| CN | 1969580 | 5/2007 |
| CN | 101222322 A | 7/2008 |
| EP | 1458198 A1 | 9/2004 |
| EP | 1536591 A1 | 6/2005 |
| RU | 2007 129 928 A | 2/2009 |
| WO | 0193528 | 12/2001 |
| WO | WO 2005/032201 A1 | 4/2005 |
| WO | WO 2007/019774 A1 | 2/2007 |
| WO | WO 2009/020789 A2 | 2/2009 |

OTHER PUBLICATIONS $3^{rd}$ Generation Partnership Project, "Technical Specification Group Servcies and System Aspects; Rationale and Track of Security Decisions in Long Term Evolved (LTE) RAN / 3GPP System Architecture Evolution (SAE) (Release 8)," 3GPP TR 33.821, v0.1.0, Feb. 2007, 84 pages.

$3^{rd}$ Generation Partnership Project, "Technical Specification Group Services and System Aspects; 3G Security; Security Architecture (Release 5)," 3GPP TS 33.102, v5.7.0, Dec. 2005, 62 pages.

$3^{rd}$ Generation Partnership Project, "Technical Specification of Group Servcies and Systems Aspects; Security Related Network Functions (Release 8)," 3GPP TS 43.020, v8.0.0, Dec. 2008, 109 pages.

$3^{rd}$ Generation Partnership Project,"Technical Specification Group Services and System Aspects; 3G Security; Specification of the A5/4 Encryption Algorithms for GSM and ECSD, and the GEA4 Encryption Algorithm for GPRS (Release 6)," 3GPP TS 55.226, v0.1.0, Feb. 2004, 22 pages.

International Search Report and translation received in Patent Cooperation Treaty Application No. PCT/CN2010/076715, mailed Dec. 16, 2010, 10 pages.

Written Opinion of the International Searching Authority and translation received in Patent Cooperation Treaty Application No. PCT/CN2010/076715, mailed Dec. 16, 2010, 8 pages.

Search Report and Partial Translation received in Chinese Patent Application No. 200910090699.4, mailed Feb. 14, 2012, 6 pages.

First Chinese Office Action and Partial Translation received in Chinese Patent Application No. 200910090699.4 mailed Jun. 19, 2012, 11 pages.

European Search Report received in European Patent Application No. 10175725.0, mailed Jul. 13, 2012, 5 pages.

Decision on Grant a Patent for Invention received in Russian Application No. 2011129116/08, mailed Feb. 15, 2013, 15 pages.

\* cited by examiner

METHOD, NETWORK ELEMENT, AND MOBILE STATION FOR NEGOTIATING ENCRYPTION ALGORITHMS

CROSS-REFERENCE TO RELATED APPLICATION

This application is a continuation of International Application No. PCT/CN2010/076715, filed on Sep. 8, 2010, which claims priority to Chinese Patent Application No. 200910090699.4, filed on Sep. 8, 2009, both of which are hereby incorporated by reference in their entireties.

FIELD OF THE INVENTION

The present invention relates to an encryption/decryption technology, and in particular, to a method, network element, and mobile station (MS) for negotiating encryption algorithms.

BACKGROUND OF THE INVENTION

In a communication system, if an encryption algorithm is permitted by the network but is not supported by the plug-in card of the mobile station (MS), errors may occur in the encryption process.

For example, the general GSM/GPRS system uses a 64-bit encryption key. Although the 64-bit encryption key can provide certain security assurance, the security level is relatively low because the key length is short. Thus, a 128-bit encryption key is introduced in the prior art. The GSM system defines an A5/4 encryption algorithm for the 128-bit encryption key. Currently, the universal subscriber identity module (USIM) card can support the A5/4 algorithm. However, the subscriber identity module (SIM) card does not support the A5/4 encryption algorithm. For a MS whose plug-in card is a SIM card, the SIM card cannot support the A5/4 encryption algorithm. Thus, during the data interactions between the MS and the network, errors may occur in the encryption process if the A5/4 encryption algorithm is used.

SUMMARY OF THE INVENTION

To overcome the problem in the prior art, embodiments of the present invention provide a method, network element, and MS for negotiating encryption algorithms, so that errors due to the fact that the plug-in card of the MS does not support an encryption algorithm can be avoided in the encryption process.

According to the first aspect of the present invention, a method for negotiating encryption algorithms includes:

Obtaining information that a plug-in card of an MS does not support a first encryption algorithm;

deleting the first encryption algorithm from an encryption algorithm list permitted by a core network element according to the information that the plug-in card of the MS does not support the first encryption algorithm; and sending the encryption algorithm list excluding the first encryption algorithm to an access network element, so that the access network element selects an encryption algorithm according to the encryption algorithm list excluding the first encryption algorithm and MS capability information sent from the MS and sends the selected encryption algorithm to the MS.

According to the second aspect of the present invention, another method for negotiating encryption algorithms includes:

if the type of a plug-in card of an MS is a SIM card, sending, by the MS, MS capability information indicating that the MS does not support A5/4 encryption algorithm to an access network element, so that the access network element selects an encryption algorithm from encryption algorithms other than the A5/4 encryption algorithm according to an encryption algorithm list sent from a core network element and MS capability information sent from the MS and sends the selected encryption algorithm to the MS; or if the type of the plug-in card of the MS is a SIM card, by the MS, deleting the A5/4 encryption algorithm from an encryption algorithm list supported by the MS, and sending the encryption algorithm list excluding the A5/4 encryption algorithm to the access network element, so that the access network element selects an encryption algorithm from encryption algorithms other than the A5/4 encryption algorithm according to the encryption algorithm list sent from the core network element and the encryption algorithm list sent from the MS and sends the selected encryption algorithm to the MS.

According to the third aspect of the present invention, a core network element includes:

an obtaining unit, configured to obtain information that a plug-in card of an MS does not support a first encryption algorithm;

an algorithm deleting unit, configured to delete the first encryption algorithm from an encryption algorithm list permitted by the core network element according to the information obtained by the obtaining unit that the plug-in card of the MS does not support the first encryption algorithm; and a sending unit, configured to send the encryption algorithm list excluding the first encryption algorithm processed by the algorithm deleting unit to an access network element, so that the access network element selects an encryption algorithm according to the encryption algorithm list excluding the first encryption algorithm and MS capability information sent from the MS and sends the selected encryption algorithm to the MS.

According to the fourth aspect of the present invention, an MS includes:

a second judging unit, configured to judge whether a plug-in card of the MS is a SIM card; and a processing unit, configured to: when the second judging unit judges that the plug-in card of the MS is the SIM card, send MS capability information indicating that the MS does not support A5/4 encryption algorithm to an access network element, so that the access network element selects an encryption algorithm from encryption algorithms other than the A5/4 encryption algorithm according to an encryption algorithm list sent from a core network element and MS capability information sent from the MS and sends the selected encryption algorithm to the MS; or when the second judging unit judges that the plug-in card of the MS is the SIM card, delete the A5/4 encryption algorithm from an encryption algorithm list supported by the MS, and send the encryption algorithm list excluding the A5/4 encryption algorithm to the access network element, so that the access network element selects an encryption algorithm from encryption algorithms other than the A5/4 encryption algorithm according to the encryption algorithm list sent from the core network element and the encryption algorithm list supported by the MS and sends the selected encryption algorithm to the MS.

In embodiments of the present invention, the MS sends the MS capability information indicating that the MS does not support the first encryption algorithm, or the core network element deletes the first encryption algorithm from the encryption algorithm list permitted by the core network element. In this way, the encryption error due to the fact that the plug-in card of the MS does not support the first encryption algorithm may be avoided.

DETAILED DESCRIPTION OF THE EMBODIMENTS

Figure 1:
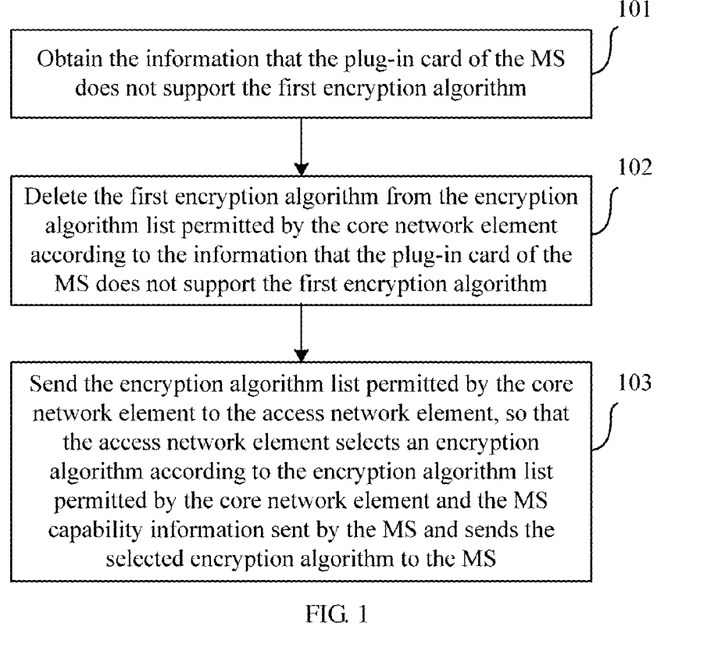
FIG. 1 is a flowchart on a core network element in a first embodiment of a method for negotiating encryption algorithms.

FIG. 1 is a flowchart on a core network element in the first embodiment of a method for negotiating encryption algorithms. The method includes the following steps:

Step 101: Obtain the information that the plug-in card of the MS does not support the first encryption algorithm.

The first encryption algorithm is an encryption algorithm that is not supported by the plug-in card of the MS but is supported by the core network element.

Step 102: Delete the first encryption algorithm from an encryption algorithm list permitted by the core network element according to the information that the plug-in card of the MS does not support the first encryption algorithm.

Step 103: Send the encryption algorithm list permitted by the core network element to the access network element, so that the access network element selects an encryption algorithm according to the encryption algorithm list permitted by the core network element and the MS capability information sent from the MS and sends the selected encryption algorithm to the MS.

Taking the A5/4 encryption algorithm as an example, the process of obtaining the information that the plug-in card of the MS does not support the first encryption algorithm in step 101 includes: obtaining the information that the plug-in card of the MS does not support the first encryption algorithm according to the security context information of the MS. For example, if the first encryption algorithm is the A5/4 encryption algorithm, the type of the plug-in card of the MS is obtained according to the authentication vector in the security context information of the MS; if the authentication vector is an authentication triplet, it is known that the type of the plug-in card of the MS is a SIM card that does not support the A5/4 encryption algorithm. In this way, the information that the plug-in card of the MS does not support the A5/4 encryption algorithm is obtained. Or if the key part of the authentication vector of the MS includes only a 64-bit encryption key, it is known that the plug-in card of the MS does not support the A5/4 encryption algorithm. In this way, the information that the plug-in card of the MS does not support the A5/4 encryption algorithm is obtained.

In the method for negotiating encryption algorithms in this embodiment, after the information that the plug-in card of the MS does not support the first encryption algorithm is obtained, if the first encryption algorithm is deleted from the encryption algorithm list permitted by the core network element, the encryption algorithm list sent to the access network element does not include the first encryption algorithm. In this way, the access network element may not select the first encryption algorithm according to the MS capability information and the encryption algorithm list permitted by the network. Thus, encryption errors due to the fact that the plug-in card of the MS does not support the first encryption algorithm may be avoided.

The following describes the implementation process of the present invention with reference to a specific scenario.

To guarantee the communication security, the GSM system reinforces the security protection in the following two aspects: In terms of network access, the network authenticates the MS that initiates an access request through the authentication center (AUC) to judge whether the MS is legally authorized; in terms of communications, the GSM system encrypts the user information transmitted on the radio path.

Generally, the authentication process is triggered by the following two methods:

(1) Triggering the authentication according to the operators' requirements. This triggering method is generally used in a scenario where roaming is performed between different operators' networks, for example, the routing area update (RAU) crossing the serving GPRS support node (SGSN) or the location area update (LAU) crossing the mobile switching center (MSC).

(2) If the core network finds that the key of the MS is different from the key on the network, the core network initiates an authentication process. If the MS does not have the valid key Kc, the MS sets the CKSN to invalid. When the MS initiates a mobility management (MM) connection next time, for example, it initiates a connection management (CM) service request or an RAU, the MS carries the CKSN in a corresponding non-access stratum (NAS) message, and sends the NAS message to the core network. If the core network finds that the CKSN of the MS is invalid, it determines that the key of the MS is different from the key on the network, and then initiates an authentication process.

Figure 2:
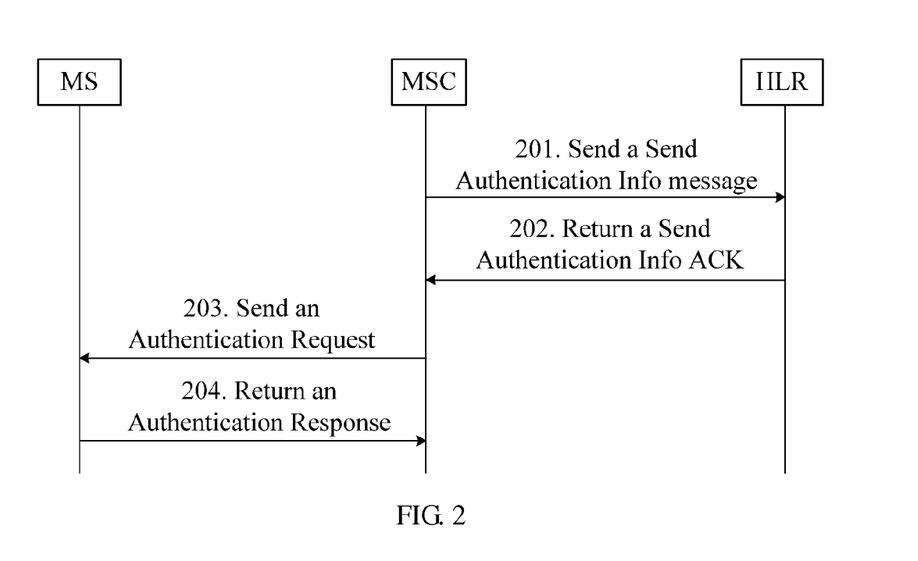
FIG. 2 shows an authentication process in an embodiment of the present invention.

The authentication process is a common part of the MM process, in which the core network and the MS transparently transmit an upper-layer NAS signaling message through a base station sub-system (BSS). FIG. 2 shows an authentication process in an embodiment of the present invention. The authentication process includes the following steps:

Step 201: If the MSC does not store the authentication triplet of the MS, the MSC sends a Send Authentication Info message that carries the international mobile subscriber identity (IMSI) of the MS to the home location register (HLR).

Step 202: The HLR searches for the authentication triplet of the MS according to the IMSI of the MS, and sends a Send Authentication Info ACK that carries the found authentication triplet. The authentication triplet includes a random number (RAND), an encryption key (Kc), and a signed response (SERS), and is provided by the AUC. The AUC generates a RAND randomly, and processes the RAND and the unique authentication value Ki of the MS by using the A3 algorithm. Then, the AUC obtains the SERS of the network.

Step 203: The MSC sends an Authentication Request that carries a RAND to the MS.

Step 204: The MS processes the RAND and the unique authentication value Ki stored on the MS by using the A3 algorithm, and obtains the SERS of the MS. The MS sends an Authentication Response that carries the SERS of the MS to the MSC.

Then, the MSC sends the SERS of the MS to the VLR; the VLR judges whether the SERS of the network is the same as the SERS of the MS; if so, the MS is legal; otherwise, the MS is an illegal MS that is not authorized. In this way, the network may release all the MM connections and radio resources (RR) connections.

In the authentication process, the MS also generates an encryption key Kc besides the SERS by processing the RAND and the Ki by using the A8 algorithm. The encryption key of the core network is generated by the AUC in the process of generating the SERS. The encryption key Kc of the core network is a part of the authentication triplet. After the authentication succeeds, the network may determine that the encryption key is the same as the Kc calculated by the MS. Then, the network may initiate an encryption process subsequently.

Figure 3:
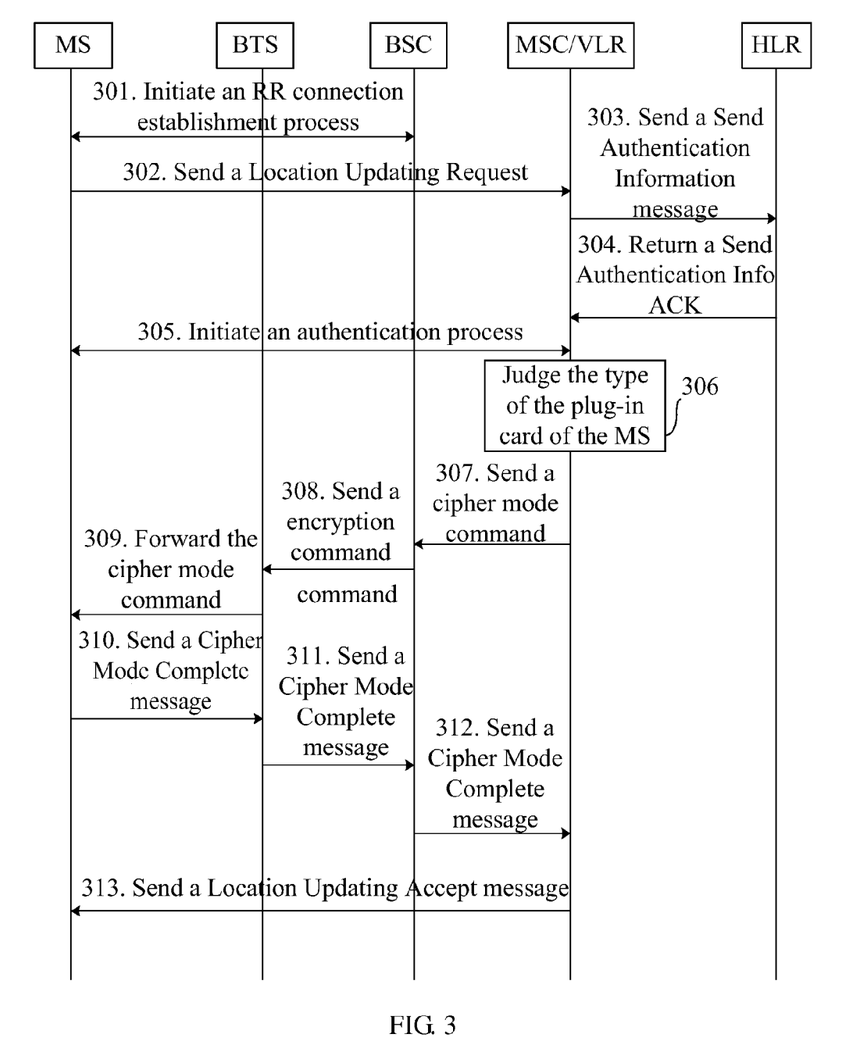
FIG. 3 illustrates a signaling interaction process in a second embodiment of the method for negotiating encryption algorithms.

In the encryption process, the MS negotiates the encryption algorithms with the network. FIG. 3 illustrates the signaling interaction in the second embodiment of the method for negotiating encryption algorithms. This embodiment provides a method for negotiating encryption algorithms in a location updating process initiated by the MS. The method includes the following steps:

Step 301: When the periodic location updating timer expires or the MS roams across location areas, the MS initiates a location updating process. The MS initiates an RR connection establishment process. In this process, the MS sends the MS capability information to the BSC. The MS capability information includes the information indicating that the MS supports the encryption algorithm. If the MS supports the A5/4 encryption algorithm in this embodiment, the MS capability information includes the information indicating that the MS supports the A5/4 encryption algorithm. Generally, the MS and the plug-in card configured on the MS implement communications together. The fact that the MS supports the A5/4 encryption algorithm does not mean that the plug-in card of the MS also supports the A5/4 encryption algorithm.

Step 302: After the RR connection is established, the MS sends a Location Updating Request to the MSC/visitor location register (VLR) to indicate the current location information of the MS to the network.

Step 303: The MSC/VLR determines that the MS needs to be authenticated. If the MSC/VLR does not have the authentication vector of the MS, the MSC/VLR may send a Send Authentication Information message that carries the IMSI of the MS to the HLR to which the MS belongs.

Step 304: The HLR searches for the authentication vector of the MS according to the IMSI of the MS. The HLR sends a Send Authentication Info ACK that carries the authentication vector of the MS to the MSC. Because the type of the plug-in card of the MS is a SIM card, the authentication vector returned by the HLR is an authentication triplet. If the type of the plug-in card of the MS is a USIM card, the authentication vector returned by the HLR is an authentication quintuplet. The authentication quintuplet includes a RAND, an expected signed response (XRES), an authentication token (AUTN), an encryption key (CK), and an integrity key (IK). The authentication vector is a kind of security information context of the MS.

Step 305: The MSC/VLR receives an authentication triplet from the HLR, and initiates an authentication process to the MS.

Step 306: After the authentication succeeds, the MSC/VLR and the access network negotiate the encryption algorithms. The MSC/VLR judges the type of the plug-in card of the MS according to the security context information of the MS sent from the HLR. In this embodiment, the security context information of the MS is an authentication triplet. Because the HLR returns the authentication triplet, the plug-in card of the MS is a SIM card. Or the MSC/VLR judges whether the encryption key of the MS in the security context information sent from the HLR includes only a 64-bit encryption key. If the encryption key of the MS includes only the 64-bit encryption key, the MSC/VLR may obtain the information that the plug-in card of the MS does not support the A5/4 encryption algorithm. Because the A5/4 encryption algorithm requires a 128-bit encryption key, the MSC/VLR executes step 307. Otherwise, the MSC/VLR executes the process of negotiating encryption algorithms in the prior art, that is, it does not execute step 307 to step 313. For example, if the encryption key includes a CK or an IK, the MSC/VLR may determine that the encryption key is a 128-bit encryption key, and perform the encryption algorithms negotiation process related to the USIM card.

Step 307: The MSC/VLR deletes the A5/4 encryption algorithm from the encryption algorithm list permitted by the MSC/VLR. The MSC/VLR sends a cipher mode command to the BSC, where the cipher mode command carries a 64-bit encryption key Kc and the encryption algorithm list permitted by the MSC/VLR. The encryption algorithm list sent from the MSC/VLR does not include the A5/4 encryption algorithm. In the cipher mode command, the bitmap may be used to represent the encryption algorithm list permitted by the network. For example, because the A5/4 encryption algorithm is deleted, the bit corresponding to the A5/4 encryption algorithm is set to 0, indicating that the A5/4 encryption algorithm is forbidden.

Step 308: The BSC selects an encryption algorithm according to the encryption algorithm list sent from the MSC/VLR and the MS capability information sent from the MS, and sends an encryption command to the base transceiver station (BTS), where the encryption command carries the selected encryption algorithm, the encryption key Kc, and the cipher mode command. Because the encryption algorithm list sent from the MSC/VLR does not include the A5/4 encryption algorithm, the BSC does not select the A5/4 algorithm even if the MS capability information indicates that the MS supports the A5/4 algorithm.

Step 309: The BTS forwards the cipher mode command to the MS, and activates the data decryption function in the upstream direction.

Step 310: After the MS receives the cipher mode command, the MS starts the data transmission and receiving in cipher mode. After performing the actions according to the cipher mode command, the MS sends a Cipher Mode Complete message to the BTS.

Step 311: After receiving the Cipher Mode Complete message, the BTS starts its own encryption process. The BTS forwards the Cipher Mode Complete message to the BSC through a data indication. The data indication is an Abis message transmitted between the BSC and the BTS. The interface between the BSC and the BTS is an Abis interface.

Step 312: The BSC sends a Cipher Mode Complete message to the MSC, indicating that the cipher mode is completed. The Cipher Mode Complete message carries the encryption algorithm selected by the BSC. After the encryption process is completed, the MS may collaborate with the BTS in sending and receiving the encryption data on radio links.

Step 313: After receiving the Cipher Mode Complete message, the MSC/VLR sends a Location Updating Accept message to the MS, indicating that the location updating request of the MS is completed. The MS location information on the network is already updated to the current location information of the MS.

As shown in FIG. 3, the BSC and the BTS are access network elements, and the MSC/VLR and the HLR are core network elements.

Figure 4:
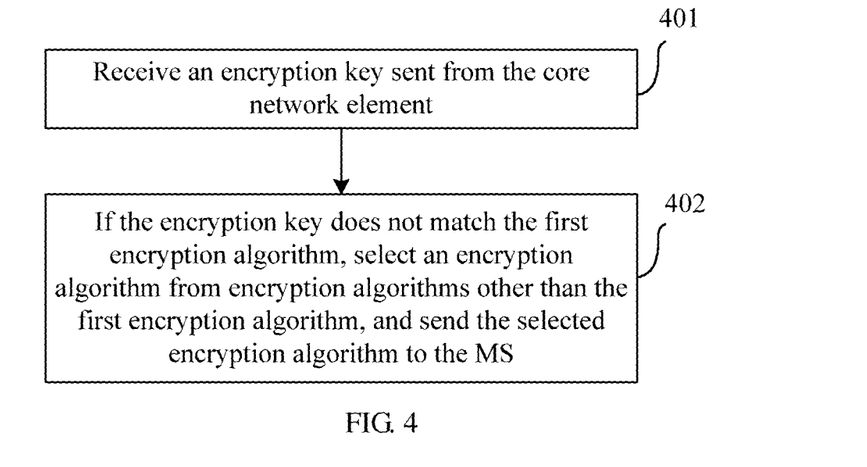
FIG. 4 illustrates a signaling interaction process in a third embodiment of the method for negotiating encryption algorithms.

FIG. 4 illustrates a signaling interaction process in the third embodiment of the method for negotiating encryption algorithms. The process includes the following steps:

Step 401: Receive an encryption key sent from the core network element.

Step 402: If the encryption key does not match the first encryption algorithm, select an encryption algorithm from encryption algorithms other than the first encryption algorithm, and send the selected encryption algorithm to the MS.

The first encryption algorithm is an encryption algorithm that is not supported by the plug-in card of the MS but is supported by the core network element.

For example, when the first encryption algorithm is an A5/4 encryption algorithm, the encryption key that does not match the first encryption algorithm may be a 64-bit encryption key. By using the method provided in the third embodiment of the present invention, no matter whether the MS capability information indicates that the MS supports the A5/4 encryption algorithm and no matter whether the encryption algorithm list sent from the core network element includes the A5/4 encryption algorithm, if the encryption key returned by the core network element is a 64-bit encryption key, the access network element selects an encryption algorithm from encryption algorithms other than the A5/4 encryption algorithm because the A5/4 encryption algorithm requires a 128-bit encryption key. That is, the access network element does not select the A5/4 encryption algorithm. In this way, encryption errors due to the fact that the plug-in card of the MS does not support the A5/4 encryption algorithm may be avoided.

Step 401 to step 402 in the fourth embodiment may be executed by the access network element, for example, the BSC on the access network.

Figure 5:
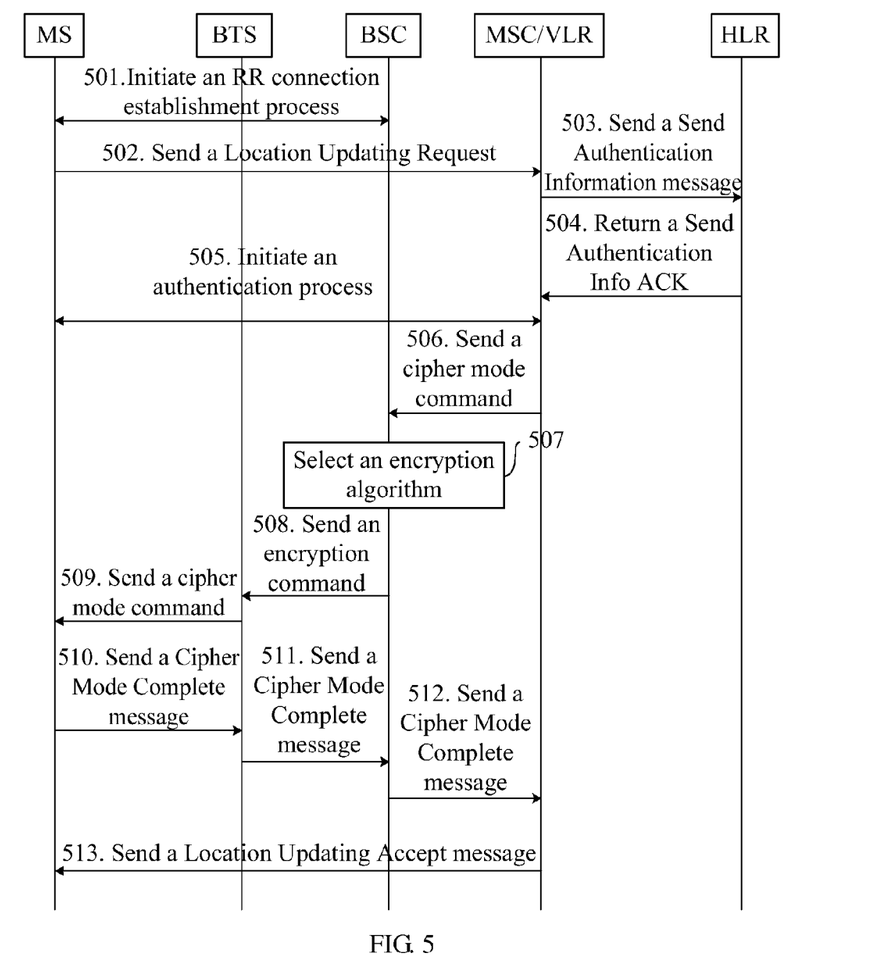
FIG. 5 illustrates a signaling interaction process in a fourth embodiment of the method for negotiating encryption algorithms.

FIG. 5 illustrates a signaling interaction process in the fourth embodiment of the method for negotiating encryption algorithms. This embodiment provides a method for negotiating encryption algorithms in a location updating process initiated by the MS. The process includes the following steps:

Step 501 to step 505 are similar to step 301 to step 305, and are not further described.

Step 506: After the authentication succeeds, the MSC/VLR negotiates encryption algorithms with the access network. The MSC/VLR sends a cipher mode command to the BSC, where the cipher mode command carries a 64-bit encryption key Kc and an encryption algorithm list permitted by the MSC/VLR. In this embodiment, the MSC does not delete the A5/4 encryption algorithm. Thus, the encryption algorithm list sent from the MSC includes the A5/4 encryption algorithm.

Step 507: The BSC selects an encryption algorithm according to the encryption algorithm supported by the BSC, the MS capability information, the encryption algorithm list sent from the MSC/VLR, and the encryption key. Because the encryption key is a 64-bit encryption key, the BSC may not select the A5/4 encryption algorithm even if the MS capability information indicates that the MS supports the A5/4 encryption algorithm and the encryption algorithm list sent from the MSC/VLR includes the A5/4 encryption algorithm. The BSC needs to select an encryption algorithm from encryption algorithms other than the A5/4 encryption algorithm.

Step 508: The BSC sends an encryption command to the BTS, where the encryption command carries the selected encryption algorithm, the encryption key Kc, and the cipher mode command.

Step 509 to step 513 are similar to step 309 to step 313, and are not further described.

The process of the fifth embodiment of the method for negotiating encryption algorithms includes the following steps:

if the type of the plug-in card of the MS is a SIM card, the MS sends the MS capability information indicating that the MS does not support the first encryption algorithm to the access network element, so that the access network element selects an encryption algorithm from encryption algorithms other than the first encryption algorithm according to the encryption algorithm list sent from the core network element and the MS capability information sent from the MS and sends the selected encryption algorithm to the MS;

or if the type of the plug-in card of the MS is a SIM card, the MS deletes the first encryption algorithm from the encryption algorithm list supported by the MS, and sends the encryption algorithm list excluding the first encryption algorithm to the access network element, so that the access network element selects an encryption algorithm from encryption algorithms other than the first encryption algorithm according to the encryption algorithm list sent from the core network element and the encryption algorithm list sent from the MS and sends the selected encryption algorithm to the MS.

The first encryption algorithm may be the A5/4 encryption algorithm. By using the method for negotiating encryption algorithms in the fifth embodiment of the present invention, if the type of the plug-in card of the MS is a SIM card, the MS may always send the MS capability information indicating that the MS does not support the A5/4 encryption algorithm to the access network element, or delete the A5/4 encryption algorithm from the encryption algorithm list supported by the MS before sending the encryption algorithm list to the access network element, no matter whether the MS can support the A5/4 encryption algorithm. In this way, no matter whether the encryption algorithm list permitted by the network includes the A5/4 encryption algorithm, the access network element may not select the A5/4 encryption algorithm, but select an encryption algorithm from encryption algorithms other than the A5/4 encryption algorithm. Thus, encryption errors due to the fact that the plug-in card of the MS does not support the A5/4 encryption algorithm may be avoided.

Figure 6:
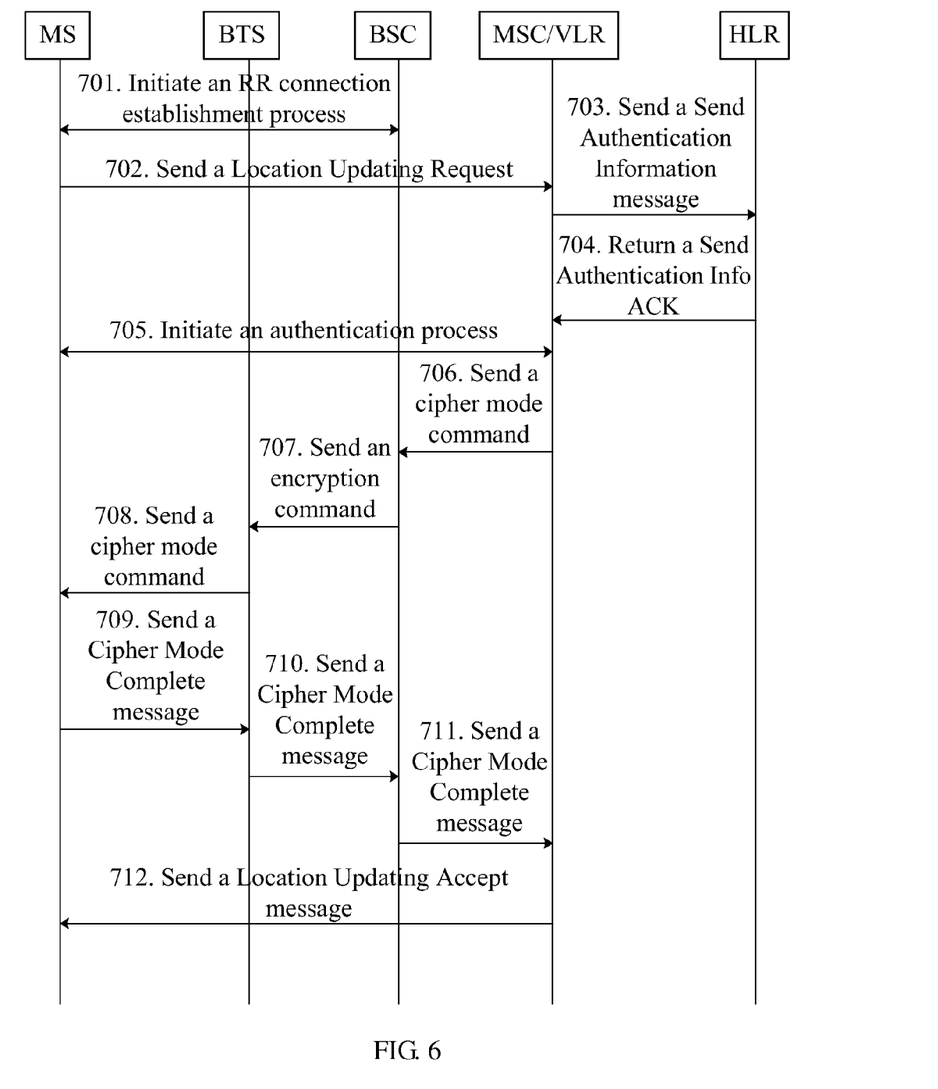
FIG. 6 illustrates a signaling interaction process in a sixth embodiment of the method for negotiating encryption algorithms.

FIG. 6 illustrates a signaling interaction process in the sixth embodiment of the method for negotiating encryption algorithms. This embodiment provides a method for negotiating encryption algorithms in a location updating process initiated by the MS. The process includes the following steps:

Step 701: The MS judges the type of the plug-in card of the MS. If the type of the plug-in card is a SIM card, the MS sends the MS capability information indicating that the MS does not support the A5/4 encryption algorithm to the BSC. If the type of the plug-in card of the MS is a USIM card, the MS may send the MS capability information indicating that the MS supports the A5/4 encryption algorithm to the BSC. The MS sends the MS capability information in the process of RR connection establishment. The MS capability information indicating that the MS supports the A5/4 encryption algorithm may be represented in the form of a bitmap. For example, if the MS capability information indicates that the MS supports the A5/4 encryption algorithm, the bit corresponding to the A5/4 encryption algorithm is set to 1; if the MS capability information indicates that the MS does not support the A5/4 encryption algorithm, the bit corresponding to the A5/4 encryption algorithm is set to 0.

Or in step 701, the MS may delete the A5/4 algorithm from the encryption algorithm list supported by the MS, and send the encryption algorithm list excluding the A5/4 encryption algorithm to the BSC.

Step 702 to step 705 are the same as step 302 to step 305.

Step 706: After the authentication succeeds, the MSC/VLR negotiates encryption algorithms with the access network. The MSC/VLR sends a cipher mode command to the BSC, where the cipher mode command carries a 64-bit encryption key Kc and the encryption algorithm list permitted by the MSC/VLR. In this embodiment, the encryption algorithm list sent from the MSC/VLR includes the A5/4 encryption algorithm.

Step 707: The BSC selects an encryption algorithm according to the encryption algorithms supported by the BSC, MS capability information, the encryption algorithm list sent from the MSC/VLR, and the encryption key, and sends an encryption command to the BTS, where the encryption command carries the selected encryption algorithm, the encryption key Kc, and the cipher mode command. Because the MS capability information indicates that the MS does not support the A5/4 encryption algorithm or the encryption algorithm list supported by the MS does not include the A5/4 encryption algorithm, the BSC may not select the A5/4 encryption algorithm, but select an encryption algorithm from encryption algorithms other than the A5/4 encryption algorithm.

Step 708 to step 712 are similar to step 309 to step 313, and are not further described.

The method provided in the preceding embodiments of the present invention may also be applied in other networks, for example, the universal mobile telecommunications system (UMTS). If an encryption algorithm that can only be used by an enhanced USIM card is introduced in the UMTS, the UMTS must use the method for negotiating encryption algorithms according to embodiments of the present invention to prevent the MS with a plug-in USIM card from using this encryption algorithm. In this scenario, the core network element may be the MSC, and the access network element may be the radio network controller (RNC), that is, the RNC may replace the BSC in embodiments of the present invention. The MS may be a user equipment (UE), that is, the UE may replace the MS in embodiments of the present invention. In this scenario, the process of negotiating encryption algorithms among the core network element, the access network element, and the MS is similar to that provided in preceding embodiments of the present invention, and is not further described.

Figure 7:
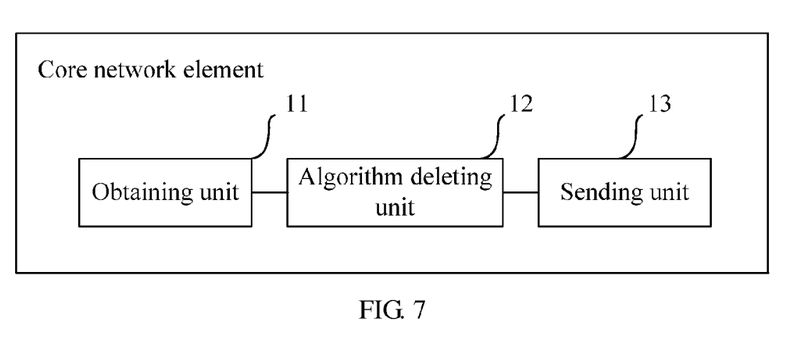
FIG. 7 shows a structure of a core network element in an embodiment of the present invention.

FIG. 7 shows a structure of a core network element in an embodiment of the present invention. The core network element includes an obtaining unit 11, an algorithm deleting unit 12, and a sending unit 13. The obtaining unit 11 is configured to obtain the information that the plug-in card of the MS does not support the first encryption algorithm. The algorithm deleting unit 12 is configured to delete the first encryption algorithm from the encryption algorithm list permitted by the core network element according to the information that the plug-in card of the MS does not support the first encryption algorithm. The sending unit 13 is configured to send the encryption algorithm list processed by the algorithm deleting unit 12 to the access network element, so that the access network element selects an encryption algorithm according to the encryption algorithm list permitted by the core network element that is sent from the core network element and the MS capability information sent from the MS, and sends the selected encryption algorithm to the MS.

The obtaining unit 11 is configured to obtain the information that the MS does not support the A5/4 encryption algorithm according to the security context information of the MS. Specifically, the obtaining unit may obtain the type of the plug-in card of the MS according to the authentication vector in the security context information of the MS. If the authentication vector is an authentication triplet, the obtaining unit knows that the type of the plug-in card of the MS is a SIM card that does not support the A5/4 encryption algorithm; or if the key part of the authentication vector of the MS includes a 64-bit encryption key, the obtaining unit knows that the plug-in card of the MS does not support the A5/4 encryption algorithm. Accordingly, the algorithm deleting unit 12 may be configured to delete the A5/4 encryption algorithm from the encryption algorithm list permitted by the core network element according to the information that the plug-in card of the MS does not support the A5/4 encryption algorithm.

The preceding core network element may be an MSC or a VLR.

In this embodiment, when obtaining the information that the MS does not support the first encryption algorithm, the core network element deletes the first encryption algorithm from the encryption algorithm list permitted by the core network element. In this way, encryption errors due to the fact that the plug-in card of the MS does not support the first encryption algorithm may be avoided.

Figure 8:
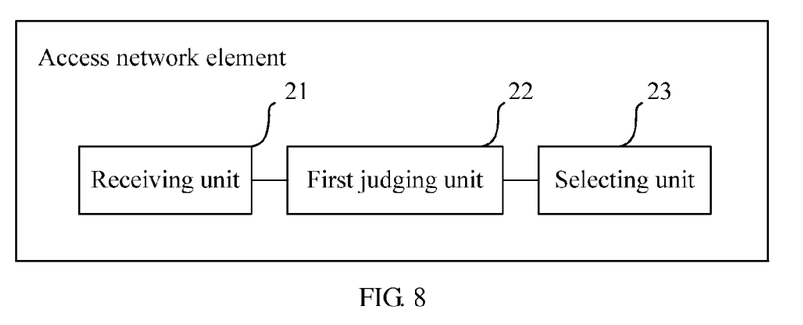
FIG. 8 shows a structure of an access network element in an embodiment of the present invention.

FIG. 8 shows a structure of an access network element in an embodiment of the present invention. The access network element includes a receiving unit 21, a first judging unit 22, and a selecting unit 23. The receiving unit 21 is configured to receive an encryption key sent from the core network. The first judging unit 22 is configured to judge whether the encryption key received by the receiving unit 21 matches the first encryption algorithm. The selecting unit 23 is configured to: select an encryption algorithm from encryption algorithms other than the first encryption algorithm when the judgment result of the first judging unit 22 is negative, and send the selected encryption algorithm to the MS.

The access network element in FIG. 8 may be the BSC or the RNC. If the access network element is the BSC, the first encryption algorithm may be the A5/4 encryption algorithm, and the encryption key that does not match the first encryption algorithm may be a 64-bit encryption key. If the access network element is the RNC, the first encryption algorithm may be an encryption algorithm that can be supported only by the enhanced USIM card but is not supported by the USIM card, and the encryption key that does not match the first encryption algorithm may be the encryption key corresponding to the USIM card.

In this embodiment, the access network element determines not to select the first encryption algorithm according to the encryption key of the MS. Thus, encryption errors due to the fact that the plug-in card of the MS does not support the first encryption algorithm may be avoided.

Figure 9:
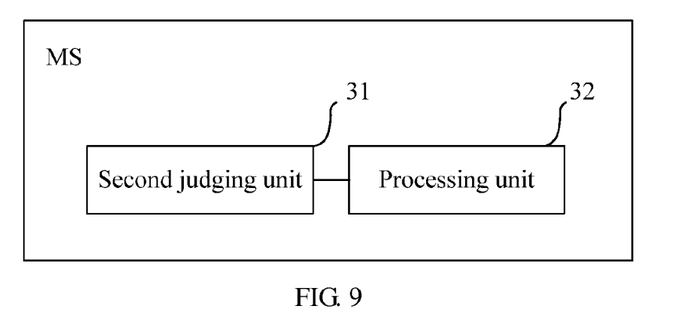
FIG. 9 shows a structure of an MS in an embodiment of the present invention.

FIG. 9 shows a structure of an MS in an embodiment of the present invention. The MS includes a second judging unit 31 and a processing unit 32. The second judging unit 31 is configured to judge whether the plug-in card of the MS is a SIM card. The processing unit 32 is configured to send the MS capability information indicating that the plug-in card of the MS does not support the first encryption algorithm to the access network element when the second judging unit 31 determines that the plug-in card of the MS is a SIM card, so that the access network element selects an encryption algorithm from encryption algorithms other than the first encryption algorithm according to the encryption algorithm list sent from the core network element and the MS capability information sent from the MS and sends the selected encryption algorithm to the MS; or the processing unit 32 is configured to: when the second judging unit 31 determines that the plug-in card of the MS is a SIM card, delete the first encryption algorithm from the encryption algorithm list supported by the MS, and send the encryption algorithm list excluding the first encryption algorithm to the access network element, so that the access network element selects an encryption algorithm from encryption algorithms other than the first encryption algorithm according to the encryption algorithm list sent from the core network element and the encryption algorithm list supported by the MS and sends the selected encryption algorithm to the MS.

The first encryption algorithm may be the A5/4 encryption algorithm. The MS capability information that indicates the MS supports the A5/4 encryption algorithm and is sent from the processing module 32 may be represented by a bitmap. For example, if the MS capability information indicates that the MS does not support the A5/4 encryption algorithm, the bit corresponding to the A5/4 encryption algorithm is set to 0.

In this embodiment, the MS sends the MS capability information indicating that the MS does not support the first encryption algorithm or the encryption algorithm list excluding the first encryption algorithm to the access network element, so that the access network element determines not to select the first encryption algorithm. In this way, encryption errors due to the fact that the plug-in card of the MS does not support the first encryption algorithm may be avoided.

It is understandable to those skilled in the art that all or part of the steps in the methods according to the preceding embodiments may be performed by hardware instructed by a program. The program may be stored in a computer readable storage medium, such as a read only memory/random access memory (ROM/RAM), a magnetic disk, and a compact disk-read only memory (CD-ROM). When the program is executed, all or part of the preceding steps is involved.

Although the technical solution of the present invention has been described through some exemplary embodiments, the invention is not limited to such embodiments. It is apparent that those skilled in the art can make various modifications and variations to the invention without departing from the scope of the present invention.

What is claimed is:

1. A method for negotiating encryption algorithms in a communication system, wherein the communication system comprises a core network element, an access network element and a mobile station (MS), and wherein an A5/4 encryption algorithm is not supported by a plug-in card of the MS, the method comprising:

obtaining, by the core network element, an authentication vector of the MS;

determining, by the core network element, an encryption algorithm list excluding the A5/4 encryption algorithm according to that a key part of the authentication vector of the MS includes a 64-bit encryption key; and sending, by the core network element, the encryption algorithm list to the access network element, to ensure that an encryption algorithm excluding the A5/4 encryption algorithm is selected by the access network element for data encryption, even if an encryption algorithm list including the A5/4 encryption algorithm is sent by the MS to the access network element wherein the encryption algorithm list-excluding the A5/4 encryption algorithm is used for the access network element to select an encryption algorithm supported by the core network element and the MS both.

2. The method of claim 1, wherein the core network element comprises a mobile switch center (MSC) or a visitors location register (VLR).

3. The method of claim 1, wherein the access network element comprises a Based Station Controller (BSC).

4. A core network element used in a communication system, wherein the communication system further comprises an access network element and a mobile station (MS), and wherein an A5/4 encryption algorithm is permitted by the core network element, but is not supported by a plug-in card of the MS, the core network element comprising:

an obtaining unit, configured to obtain an authentication vector of the MS;

an algorithm deleting unit, configured to determine an encryption algorithm list excluding the A5/4 encryption algorithm according to that a key part of the authentication vector of the MS includes a 64-bit encryption key; and a sending unit, configured to send the encryption algorithm list to the access network element, to ensure that an encryption algorithm excluding the A5/4 encryption algorithm is selected by the access network element for data encryption, even if an encryption algorithm list including the A5/4 encryption algorithm is sent by the MS to the access network element.

5. The core network element of claim 4, wherein the core network element comprises a mobile switch center (MSC) or a visitors location register (VLR).

6. The core network element of claim 4, wherein the access network element comprises a Based Station Controller (BSC).

* * * * *

UNITED STATES PATENT AND TRADEMARK OFFICE
CERTIFICATE OF CORRECTION

PATENT NO.        : 8,908,863 B2                                        Page 1 of 1
APPLICATION NO.   : 13/415681
DATED             : December 9, 2014
INVENTOR(S)       : Jing Chen It is certified that error appears in the above-identified patent and that said Letters Patent is hereby corrected as shown below:

In the Claims

In Col. 12, lines 17 - 21, claim 1, delete "wherein the encryption algorithm list-excluding the A5/4 encryption algorithm is used for the access network element to select an encryption algorithm supported by the core network element and the MS both".

In Col. 12, lines 30 - 31, claim 4, delete "is permitted by the core network element, but".

Signed and Sealed this
Fourteenth Day of April, 2015

Michelle K. Lee
*Director of the United States Patent and Trademark Office*